J. L. NEBLE & A. HANSEN.
PALLET TRUCK.
APPLICATION FILED OCT. 20, 1911.
1,021,880.
Patented Apr. 2, 1912.
2 SHEETS—SHEET 1.
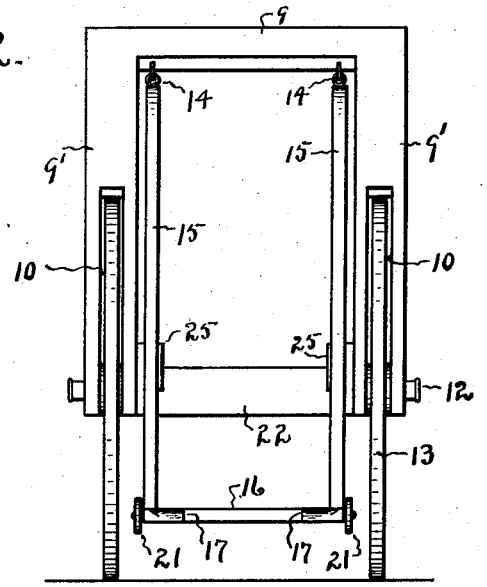
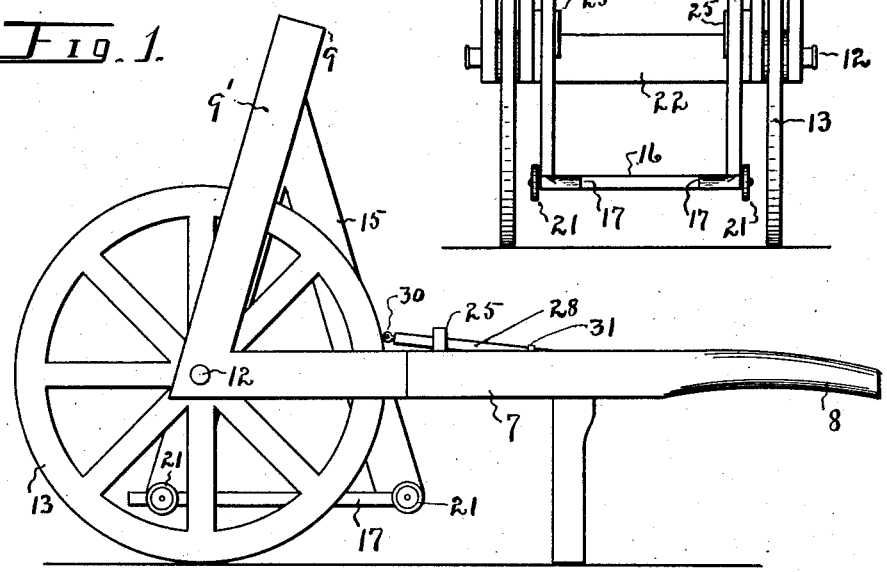
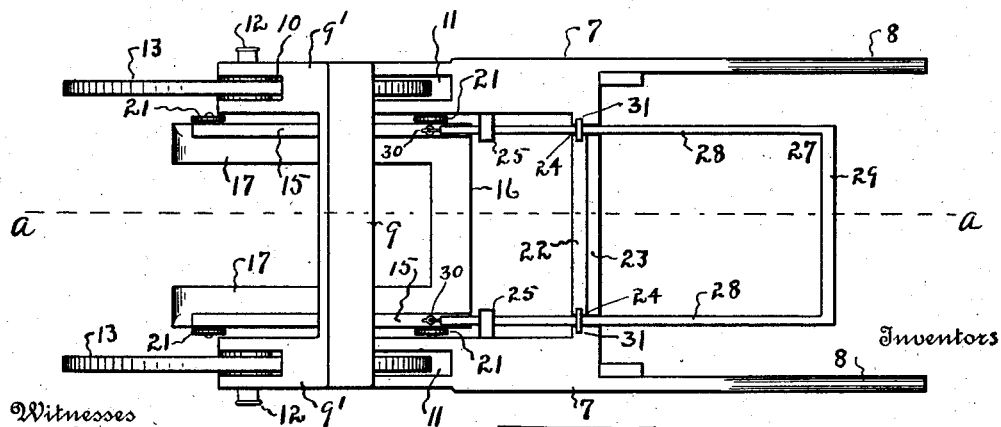
Witnesses
Inventors
John L. Neble and
Anders Hansen,
Hiram A. Sturges, Attorney J. L. NEBLE & A. HANSEN.
PALLET TRUCK.
APPLICATION FILED OCT. 20, 1911.
1,021,880.
Patented Apr. 2, 1912.
2 SHEETS—SHEET 2.
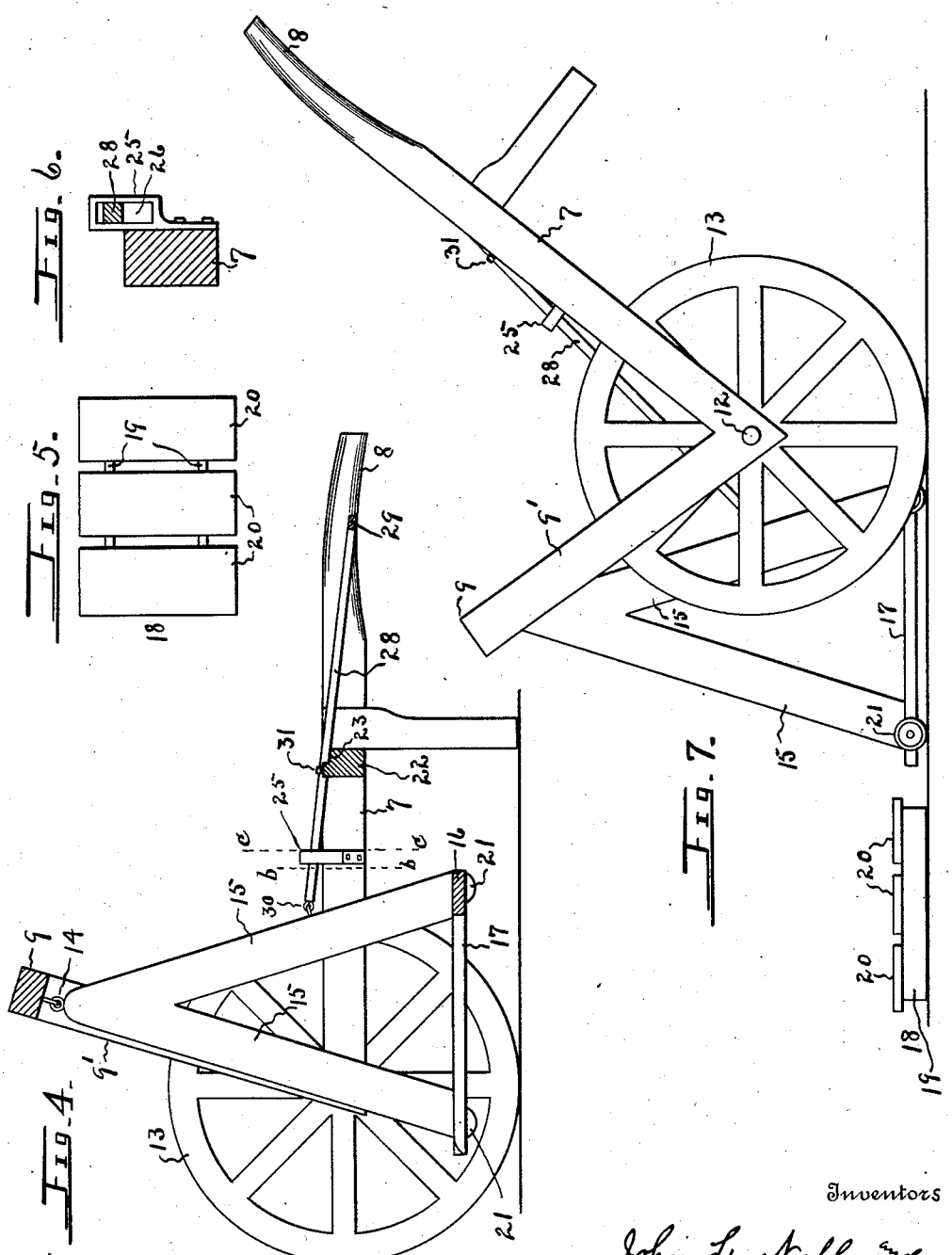

UNITED STATES PATENT OFFICE.

JOHN L. NEBLE AND ANDERS HANSEN, OF OMAHA, NEBRASKA.

PALLET-TRUCK.

1,021,880.     Specification of Letters Patent.     Patented Apr. 2, 1912.

Application filed October 20, 1911. Serial No. 655,713.

*To all whom it may concern:*

Be it known that we, JOHN L. NEBLE and ANDERS HANSEN, citizens of the United States, residing at Omaha, in the county of Douglas and State of Nebraska, have invented certain new and useful Improvements in Pallet-Trucks, of which the following is a specification.

This invention relates to an improvement in pallet trucks, and has for its object to provide an article of this class which will consist of few parts, may be economically manufactured, and will be durable in use.

The truck is for the purpose of conveniently loading, conveying and depositing pallets upon which brick have been placed, and the invention includes a truck having a support or yoke rigidly connected with the side bars and extending above and spanning the distance between the wheels, and a U-shaped platform disposed between the wheels for sustaining the pallets when loaded with brick, the platform being dependably mounted upon the yoke, and adapted to be controlled in its swinging movements by a frame-member or guide slidably mounted upon the truck.

By use of the herein described truck, pallets upon which heavy loads of brick have been placed, may be readily loaded upon, conveyed, and unloaded from the truck without manual handling.

The invention consists of the novel construction, combination and arrangement of parts as described herein and claimed, and as illustrated in the drawing, it being understood that changes in form, size, proportion and minor details may be made within the scope of the claims without departing from the spirit of the invention or sacrificing any of its advantages.

In the drawing, Figure 1 is a vertical, side view of a pallet truck embodying our invention. Fig. 2 is a front view of the same. Fig. 3 is a plan view of the truck. Fig. 4 is a sectional view on line *a a* of Fig. 3. Fig. 5 is a plan view of a pallet. Fig. 6 is a sectional view between lines *b b* and *c c* of Fig. 4 showing an alining bracket. Fig. 7 is a side view of the truck showing relative position of parts when the pallet is being loaded upon the platform.

Referring now to the drawing for a more particular description, the truck consists of the side-bars 7 having terminal handles 8, their opposite terminals being provided with a yoke 9, having substantially parallel arms 9' disposed in angular relation to and rigidly connected with the side bars, the arms and side bars being preferably formed with the respective slots 10 and 11, and providing bearings at their junctions for spindles 12 of the truck wheels 13, said wheels being disposed within the slots.

As thus described, the yoke is disposed transversely of the truck above the wheels and provides pivotal mountings 14 for the upright, parallel, downwardly-divergent side-members 15 which carry at their lower ends the U-shaped platform 16, said platform normally being disposed horizontally and projecting inwardly of the side-members to which it is secured to form ledges 17, for supporting the pallet.

In the work of handling brick by use of the herein described truck, pallets 18 are employed, each consisting of parallel strips or supports 19 which may rest upon the ground, cross-plates 20 being secured upon and projecting outwardly of the sides of the supporting-strips. The length of cross-plates 20 is less than the distance apart of side-members 15 but greater than the distance apart of ledges 17.

Platform 16 is provided with wheels 21, and when the handles 8 are elevated to dispose the truck in the position shown in Fig. 7, platform 16 will be lowered and will swing forwardly, wheels 21 resting upon the ground; and by moving the truck forwardly, ledges 17 will pass under cross-plates 20 at the sides of the pallet. At this time if the operator lowers handles 8, platform 16 will be elevated, side-members 15 swinging rearwardly, and the truck, with the load supported upon ledges 17, may be moved away.

To unload the pallet, the operator elevates handles 8; members 15 will then swing forwardly and wheels 21 may rest upon the ground. At this time the pallet will also rest upon the ground, since ledges 17 will be disposed at a lower altitude than cross-pieces 20 of the pallet; and by moving the truck rearwardly, the U-shaped platform will be wholly disengaged from the pallet.

The arms of the yoke with reference to the side bars are disposed, preferably, at somewhat less than a right angle, and with wheels 13 for fulcrums, the parts operate to advantage as levers for lifting and conveying the heavy loads which may be placed upon the pallets.

Side members 15 are of inverted V-shape, the arms of these members being flat and comparatively thin to occupy a limited space transversely of the truck, and having an adequate width to form strong members for sustaining the weight which may rest upon the ledges. While they may have a limited sidewise swinging movement, as when the truck is moving over uneven surfaces, they will not make contact with wheels 13, since the latter are disposed within slots 10 and 11.

At 22 is indicated the cross-bar which connects the side-bars of the truck. A longitudinal recess 23 is preferably formed in the cross-bar; and at 24 are indicated transverse slots formed in the upper face of the cross bar to open upon recess 23, these slots being normally in alinement with the arms of side-members 15.

Suitably secured to side-bars 7, between the cross-bar and side-members 15, are brackets 25 having elongated apertures 26 formed therein, also in alinement with the arms of the side-members.

At 27 is indicated a rigid, angular operating frame consisting of the parallel guides or bars 28 and the connecting handle 29, said handle being disposed substantially at right angles to bars 28.

Bars 28 are disposed within slots 24 and confined therein by clips or staples 31, and traverse apertures 26 of the brackets; and they are pivotally mounted at 30 upon side members 15; and in operation, when unloading the pallet, the forwardly swinging movement of the yoke will be limited by handle 29, since bars 28 are of such a length that said handle will be disposed in recess 23 at the time wheels 21 rest upon the ground. Also by reason of the engagement of handle 29 with the cross-bar, as last described, the yoke will be drawn rearwardly with the truck, when it is desired to disengage the ledges from the pallet, when unloading. In the operation of loading the pallet upon the ledges, the operator manually uses the handle to cause the operating frame 27 to resist any rearward swinging movement of the yoke while the truck is moved forwardly to dispose ledges 17 below crossplates 20. To accomplish this, the operator manually holds the handle 29 in engagement with the cross-bar after it has entered recess 23.

After the pallet has been loaded upon the ledges and the side bars 7 have been lowered, platform 16 and the pallet thereon will be at a sufficient distance above the ground so that the truck may be moved in the usual manner. When moving over uneven surfaces the operating frame tends to prevent a sidewise swinging movement of platform 16, since bars 28 have stationary bearings upon the truck in alinement with the arms of the V-shaped side-members.

Having fully described the several parts, and their uses, a further explanation relating to operation is not necessary.

What we claim as our invention and desire to secure by Letters Patent is,—

1. In a truck of the character described, the combination with a barrow like main frame having a pair of handles at its rear end, an upstanding yoke mounted upon said frame at its forward end and inclined rearwardly from the vertical, there being communicating recesses formed in the frame and yoke, ground wheels located in said recesses, a platform hinged at its top to the yoke, supporting wheels for the said platform, pallet supporting ledges carried by said platform, a rigid frame member mounted for longitudinal sliding movement upon the main frame in such manner that movement of said frame member in any other direction than longitudinally is prevented and pivotal connections between said handle frame and said platform.

2. In a device of the character described, the combination with a barrow like main frame, ground wheels therefor, an upstanding yoke carried thereby, a pallet supporting platform hinged to the top of and depending from said yoke, supporting wheels upon said platform, a handle frame comprising a pair of side members and a rear end transverse connecting member, means for pivotally connecting the side members to the platform at their forward ends, a transverse connecting bar forming a part of the main frame, recesses formed in said bar through which the side members of the handle frame slide, and keepers to prevent other than longitudinal sliding movement of the handle frame, said transverse connecting bar being recessed for the reception of the rear transverse connecting member of the handle frame at its forward limit of movement.

3. A truck, comprising, in combination with connected side-bars provided with wheels, a yoke disposed above the wheels and having its arms arranged in angular relation to and rigidly connected with the sidebars; a platform of substantially U-shape provided with bearing-wheels and with upright substantially-parallel side-members, said platform being normally disposed horizontally between the wheels with its sidemembers mounted pivotally upon the yoke to form parallel ledges projecting inwardly of the side-members; stationary guides upon the truck normally in alinement with the side members; and a rigid frame member for controlling the pivotal movements of the side-members of said platform, said frame member being pivotally mounted upon the side-members and extending rearwardly of the truck in engagement with said guides.

4. The combination with a truck having side bars connected by a cross-bar and provided with wheels; a yoke disposed transversely of and having substantially parallel arms rigidly mounted upon the side bars; a platform having arms pivotally mounted upon the yoke, said platform consisting of connected ledges extending longitudinally of the truck and transversely from the arms in directions of each other; and a rigid operating-frame for controlling the movements of the platform, said operating-frame being slidably mounted upon the cross-bar of the truck and pivotally connected with the arms of said platform.

5. A truck, comprising, in combination with side bars provided with wheels and connected at their front terminals by a yoke extending above the wheels, and connected intermediate their terminals by a cross-bar; upright supporting-members of inverted V-shape pivotally mounted upon the yoke and disposed between the wheels; ledges disposed substantially at right angles to and mounted upon the inner sides of the upright-supporting-members to extend longitudinally of the truck; and a handle-bar disposed rearwardly of and substantially parallel with the cross-bar and connected with the arms of the upright supporting-members for controlling their pivotal movements.

In testimony whereof we have affixed our signatures in presence of two witnesses.

JOHN L. NEBLE.
ANDERS HANSEN.

Witnesses:
HIRAM A. STURGES,
WM. MARSH.

---

Copies of this patent may be obtained for five cents each, by addressing the "Commissioner of Patents, Washington, D. C."